US008139517B2

United States Patent
Oger et al.

(10) Patent No.: US 8,139,517 B2
(45) Date of Patent: Mar. 20, 2012

(54) METHOD OF GENERATING AND DEMULTIPLEXING AN OPTIMIZED CONTRIBUTION SIGNAL, AND REGIONALIZED DATA BROADCASTING SYSTEM

(75) Inventors: Benoit Oger, Chantepie (FR); Eric Lebars, Geveze (FR); Richard Lhermitte, Rennes (FR)

(73) Assignee: Thomson Licensing (FR)

( * ) Notice: Subject to any disclaimer, the term of this patent is extended or adjusted under 35 U.S.C. 154(b) by 911 days.

(21) Appl. No.: 12/089,798

(22) PCT Filed: Oct. 13, 2006

(86) PCT No.: PCT/EP2006/067400
§ 371 (c)(1),
(2), (4) Date: Jul. 21, 2008

(87) PCT Pub. No.: WO2007/042574
PCT Pub. Date: Apr. 19, 2007

(65) Prior Publication Data
US 2009/0040962 A1 Feb. 12, 2009

(30) Foreign Application Priority Data
Oct. 14, 2005 (FR) ..................................... 05 10510

(51) Int. Cl.
*G06F 15/16* (2006.01)
(52) U.S. Cl. ......................... 370/316; 370/307; 370/319
(58) Field of Classification Search ................... 370/316
See application file for complete search history.

(56) References Cited

U.S. PATENT DOCUMENTS

| 5,485,464 | A | * | 1/1996 | Strodtbeck et al. ........... 370/319 |
| 5,625,624 | A | * | 4/1997 | Rosen et al. ................... 370/307 |
| 7,162,199 | B1 | * | 1/2007 | Glickstein et al. ........... 455/3.02 |
| 2003/0140353 | A1 | | 7/2003 | Hugenberg et al. |
| 2004/0095966 | A1 | | 5/2004 | Kato et al. |
| 2004/0190515 | A1 | | 9/2004 | Nogima et al. |

OTHER PUBLICATIONS

"Digital Video Broadcasting (DVB); DVG-H Implementation Guidelines; ETSI TR 102 377." ETSI Standards, European Telecommunications Standards Institute, Sophia-Antipo, FR, vol. BC, No. V111, Feb. 2005, XP014027140, ISSN: 0000-0001.

* cited by examiner

*Primary Examiner* — Jeffrey Pwu
*Assistant Examiner* — Sulaiman Nooristany
(74) *Attorney, Agent, or Firm* — Lowe Hauptman Ham & Berner, LLP

(57) ABSTRACT

The invention relates to a method of generating an optimized contribution signal comprising multiplexes. Each multiplex comprises global broadcasting services and its own combination of regional services. Each multiplex comprises stuffing packets and packets transporting signaling tables. The optimized contribution signal is generated by retaining only the global broadcasting services that are different from one another. The stuffing packets are marked and the packets transporting the signaling tables according to the multiplex to which they belong. Data bursts are constructed from the data streams corresponding to the global broadcasting services, to the regional services and to the marked stuffing packets and to the marked packets transporting the signaling tables. Another subject of the invention is a demultiplexing method, an optimized contribution signal and a regionalized data broadcasting system, and a receiver. More particularly, the invention makes it possible to optimize the bandwidth needed to broadcast, in data bursts, notably via a satellite link, global broadcasting services and regional broadcasting services.

13 Claims, 5 Drawing Sheets

METHOD OF GENERATING AND DEMULTIPLEXING AN OPTIMIZED CONTRIBUTION SIGNAL, AND REGIONALIZED DATA BROADCASTING SYSTEM

CROSS-REFERENCE TO RELATED APPLICATIONS

The present Application is based on International Application No. PCT/EP2006/067400, filed on Oct. 13, 2006, which in turn corresponds to French Application No. 05 10510, filed on Oct. 14, 2005, and priority is hereby claimed under 35 USC §119 based on these applications. Each of these applications are hereby incorporated by reference in their entirety into the present application.

FIELD OF THE INVENTION

The invention relates to a method of generating and demultiplexing contributions. More specifically, the invention makes it possible to optimize the bandwidth needed to broadcast, in data bursts via a satellite link notably, global broadcasting services and regional broadcasting services. The invention notably applies to a multiregional broadcasting of services in data bursts. Another subject of the invention is a regionalized data broadcasting system.

BACKGROUND OF THE INVENTION

The broadcasting of services to mobile receivers, such as, for example, cell phones or personal digital assistants, notably comprises a step for generating the contribution signal and a step for receiving and forwarding services by regional terrestrial transmitters. The contribution signal is, for example, routed to the various regions via a satellite contribution link. However, the available bandwidth on a satellite is particularly limited and therefore costly.

The broadcasting of services to mobile receivers can use techniques for broadcasting data in successive bursts, as proposed, for example, by the DVB-H standard. This technique makes it possible to make substantial energy savings on the receivers. The current means make it possible to broadcast services to mobile receivers while optimizing the bandwidth used on the contribution link. However, such systems do not manage a contribution link delivering global broadcasting services and regional services to several terrestrial networks distributed over several geographic areas and with the data broadcast in bursts. To broadcast global and regional services in bursts to several regions, it is necessary to broadcast, for each region, the global services and specific regional services. Also, the transmission, for each region, of regional and global broadcast data leads to a redundancy of the global broadcasting information and an under-optimized use of the satellite resources.

The broadcasting of global and regional services in data bursts to several regions comes up against the complexity of reconstructing the original stream after the step for receiving the contribution signal.

Furthermore, the broadcasting of services in bursts is normally done using a single frequency network infrastructure. The terrestrial transmitters that broadcast the regional services must be synchronized. For this, the receivers receive synchronization information originating from the contribution link in the form of synchronization frames or "megaframe initialization packets" (MIP). The broadcasting of global and regional services in bursts to several regions must therefore restore the MIP frames on reception without altering their accuracy. Each MIP frame, inserted regularly into the stream, delivers a time reference between the stream and a reference clock. Thus, the deviations and jitter between the transfer times from the satellite to the various regions can be eliminated. Equipment suitable for inserting MIP frames can correctly insert the MIP frames into a stream whose bit rate is known and constant between the moment when the stream is sent and the moment when the stream is received. However, it is not possible to use them in a contribution context. In practice, the bit rate of the contribution signal can differ from the bit rate of the signal broadcast in a given geographic region, since certain services may not concern certain regions. Since the bit rate differs between the signal transmitted over the contribution link and the signal received by the transmitters, the values included in the MIP frames inserted by equipment suitable for inserting MIP frames are incorrect.

SUMMARY OF THE INVENTION

The main aim of the invention is to overcome the above-mentioned drawbacks. To this end, the subject of the invention is a method of generating an optimized contribution signal comprising multiplexes. Each multiplex comprises global broadcasting services and its own combination of regional services, stuffing packets and packets transporting signaling tables. The optimized contribution signal is generated by:
  retaining only the global broadcasting services that are different from one another;
  marking the stuffing packets and the packets transporting the signaling tables according to the multiplex to which they belong;
  constructing data bursts from the data streams corresponding to the global broadcasting services, to the regional services, and to the marked stuffing packets and to the marked packets transporting the signaling tables.

In an embodiment, the stuffing packets and the packets transporting the signaling tables are marked by applying a translation of the identifier of said stuffing packets and of the packets transporting the signaling tables.

The data bursts of the optimized contribution signal can be constructed firstly for all the global broadcasting services then secondly for all the regional services. The optimized contribution signal can comprise synchronous data bursts with identical period and bit rate. Synchronization information can be introduced into the optimized contribution signal.

In an embodiment, the optimized contribution signal conforms to the DVB-H standard.

Another subject of the invention is a demultiplexing method. For a given geographic region, from an optimized contribution signal comprising data relating to at least one multiplex, each multiplex comprising global and regional broadcasting services, stuffing packets and packets transporting signaling tables marked according to the multiplex to which they belong, a signal is constructed by:
  retaining only the services intended for said geographic region;
  constructing data bursts from the data streams included in the optimized contribution signal corresponding:
    to the global broadcasting services;
    to the regional services intended for said geographic region;
    to the marked stuffing packets and to the marked packets transporting the signaling tables corresponding to the regional services intended for said geographic region.

In an embodiment, during the data burst construction step, the identifier of the marked stuffing packets and the marked packets transporting the signaling tables is translated so as to reconstruct the data streams corresponding to the services intended for the geographic region.

The method can also comprise a step for smoothing the bit rate of the signal constructed in the data burst construction step.

Yet another subject of the invention is a system for broadcasting regional services and global broadcasting services. The system is able to generate an optimized contribution signal comprising multiplexes. Each multiplex comprises the global broadcasting services and its own combination of regional services, and each multiplex comprises stuffing packets and packets transporting signaling tables. The system is able to broadcast certain regional services and global broadcasting services in data bursts. The contribution signal is generated by:

retaining only the global broadcasting services that are different from one another;

marking the stuffing packets and the packets transporting the signaling tables according to the multiplex to which they belong;

constructing data bursts from the data streams corresponding to the global broadcasting services, to the regional services, and to the marked stuffing packets and to the marked packets transporting the signaling table, said system preferably being able to implement a signal generation method conforming to the inventive signal generation method.

In an embodiment, said system is designed to broadcast the multiplexes over a coverage area comprising geographic regions. Each geographic region receives at least one multiplex. The system comprises receivers distributed over various geographic regions and able to receive said optimized signal transmitted in the coverage area. Each receiver is able to generate from the optimized contribution signal a signal to be transmitted intended for the geographic region in which said receiver is located. The signal to be transmitted is transmitted by transmission means to the whole of the geographic region in which the transmission means are located. The transmission means form a single frequency network and are synchronized. At least some of said receivers are preferably able to implement a signal demultiplexing method conforming to the inventive signal demultiplexing method.

Another subject of the invention is a receiver comprising a processing unit, an input and an output. The input is designed to receive an optimized contribution signal comprising data relating to at least one multiplex. Each multiplex comprises global and regional broadcasting services, stuffing packets and packets transporting signaling tables marked according to the multiplex to which they belong. The processing unit is able to construct a signal sent to the output by:

retaining only the services intended for said geographic region;

constructing data bursts from the data streams included in the optimized contribution signal corresponding:

to the global broadcasting services;

to the regional services intended for said geographic region;

to the marked stuffing packets and to the marked packets transporting the signaling tables corresponding to the regional services intended for said geographic region.

Said receiver is preferably able to implement a signal demultiplexing method conforming to the inventive signal demultiplexing method.

Another subject of the invention is an optimized contribution signal comprising multiplexes. Each multiplex comprises global broadcasting services and its own combination of regional services. Each multiplex comprises stuffing packets and packets transporting signaling tables. The optimized contribution signal is such that:

the global broadcasting services are different from one another;

the stuffing packets and the packets transporting the signaling tables are marked according to the multiplex to which they belong;

said signal comprises data bursts constructed from the data streams corresponding to the global broadcasting services, to the regional services, and to the marked stuffing packets and to the marked packets transporting the signaling tables.

Said signal is preferably generated by a signal generation method conforming to the inventive signal generation method.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
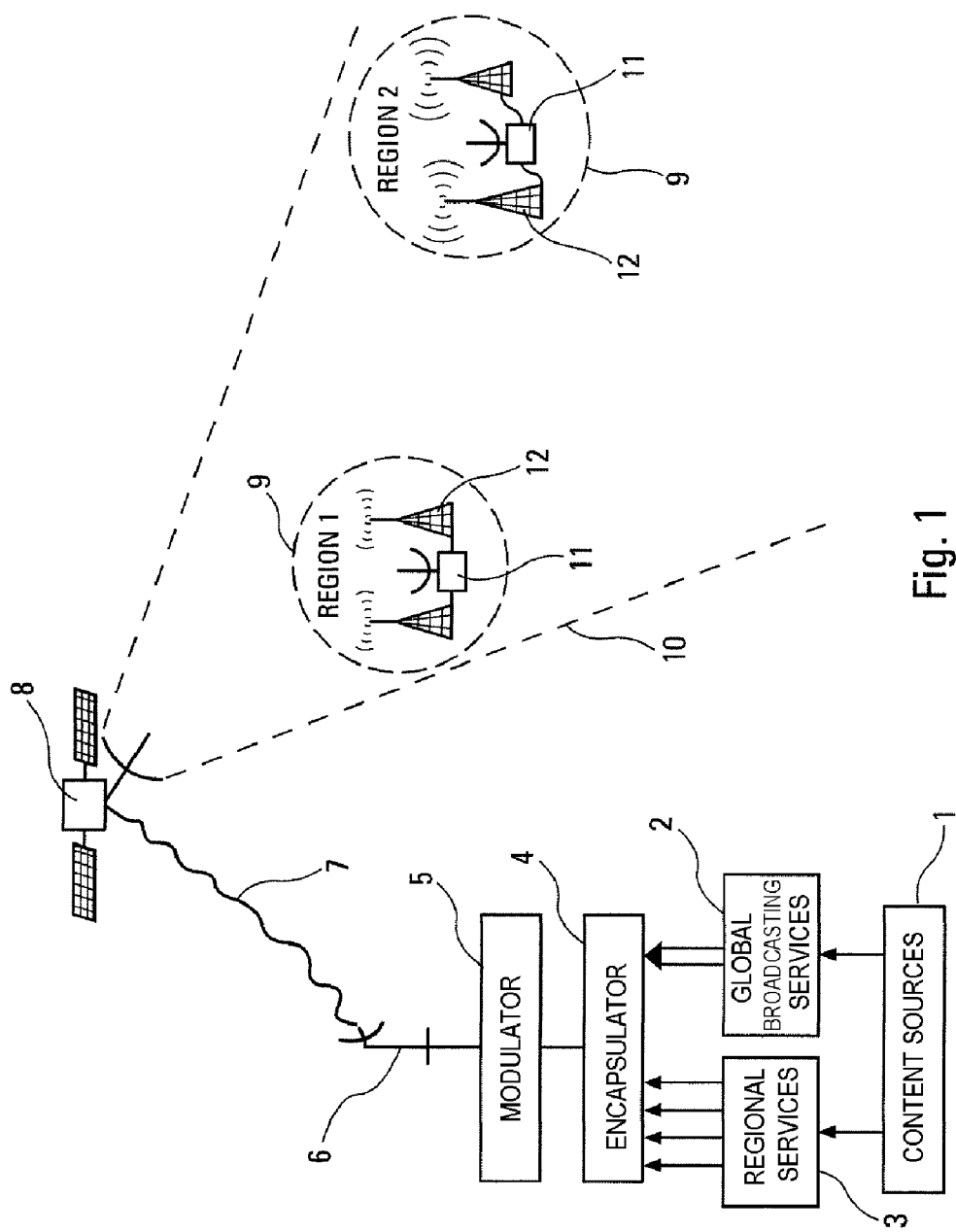
FIG. 1, an architecture of the inventive regionalized data broadcasting system.

FIG. 1 represents an architecture of the inventive regionalized data broadcasting system. The regionalized data broadcasting system according to the invention comprises a part, one of whose functions is to generate a contribution signal. Content sources 1 generate data streams. The content sources 1 can, for example, be file servers, control rooms, drives or any other equipment delivering a content. The generated data streams can, for example, be IP data streams. The various data streams comprise a variety of services or programs. Among the services included in the data streams, there are regional services 3 that have to be broadcast only in certain geographic regions 9 and global broadcasting services 2, such as, for example, national services. An encapsulator 4 receives the data streams corresponding to the regional services 3 and to the global broadcasting services 2. The encapsulator 4 receives the data streams, for example the IP data streams, and constructs the signals intended for each of the various geographic regions 9. The signal constructed by the encapsulator 4 for a given geographic region 9 is a multiplexed signal, also called multiplex, comprising all the data streams corresponding to the regional services 3 specific to that geographic region 9 and to the global broadcasting services 2.

The encapsulator 4 can, notably, be responsible for creating the successive data bursts for all the regional services 3 and global broadcasting services 2. A data stream transmitted in bursts comprises alternating data stream transmission phases and silence phases of a duration that is a priori known. The discontinuous sending of data allows the equipment receiving a data stream transmitted in bursts to switch itself to standby in times of silence, and resume receiving a little before the start of reception of the next data stream, a mechanism made possible by knowing the transmission time of the next packet. The DVB-H standard describes such an operating mode, with the aim of saving on receiver energy sources.

The encapsulator 4 can conform to the requirements of the DVB-H standard. The signals intended for each of the various geographic regions 9 then comprise services to be broadcast in data bursts. It is also possible to obtain at the output of the encapsulator 4 multiplexed signals comprising both services to be broadcast in successive bursts and multiplexed broadcasting services. The encapsulator 4 can even have the function of reorganizing the various multiplexed signals prior to broadcasting, so as to optimize the necessary bandwidth.

In an embodiment, the encapsulator 4 can even insert into the various signals frames comprising synchronization information for the receiving equipment. For example, the encapsulator 4 can insert MIP frames. The MIP frames include the information needed to accomplish the synchronization between the transmission means 12. Equipment, called MIP-inserters, can correctly insert MIP frames into a stream. However, it is not possible to use such equipment in a contribution context. This is why the generation of the MIP frames can be implemented at the level of the construction of the data streams intended for the various geographic regions 9, before the construction of the contribution signal. This implementation is possible because the encapsulator 4 can itself be synchronized on an external clock of GPS type. Since the regionalized data broadcasting system according to the invention ensures the integrity of the data streams received in each geographic region 9, the MIP frames will still be valid.

The multiplexed signals obtained from the encapsulator 4 are then transmitted to a modulator 5 responsible for adapting the signals to the constraints of the transmission channels. It can, for example, modulate the received signals before transmitting them to an antenna 6 for broadcasting to a satellite system 8. The satellite system 8 comprises one or more satellites. The signal transmitted to the satellite system 8 via the antenna 6 is called contribution signal 7. The bandwidth available for the contribution signal 7 is particularly costly and limited. A notable object of the invention is to reduce the bandwidth requirement needed for the contribution signal 7.

The satellite system 8 broadcasts the contribution signal 7 over a coverage area 10. The coverage area 10 notably comprises several geographic regions 9. In each geographic region 9 there is at least one receiver 11 coupled to transmission means 12. Each receiver 11 receives the signal from the satellite system 8 and demodulates it as required. This signal is identical in the coverage area 10 for all the receivers 11, independently of the geographic region 9 of the receiving site. The receiver 11 extracts the services intended for the geographic region 9 in which it is located. Thus, the extracted services are then only the global broadcasting services 2 and the regional services 3 intended for the geographic region 9 of the receiver 11. The extracted services can be any of services to be broadcast in bursts, services for multiplexed broadcasting or any combination of the two types of services. Finally, the data streams corresponding to the extracted services can conform to the DVB-H standard. The receiver 11 transmits the extracted services to the transmission means 12. The function of the transmission means 12 is to broadcast the extracted services to all of their geographic region 9. The transmission means 12 can notably be microwave transmitters distributed over all of the geographic region 9. The transmission means 12 can form a single-frequency network. The transmission means 12 of the coverage area 10 must then be synchronized in order to exclude mutual interferences. To do this, the transmission means 12 are synchronized by the MIP frames generated, for example, by the encapsulator 4. The MIP frames comprise the information needed to accomplish the synchronization between the transmission means 12.

FIG. 1 illustrates an architecture of the regionalized data broadcasting system according to the invention implementing a contribution signal 7 broadcast by a satellite system 8. However, any other broadcasting means with a bandwidth that has to be optimized can be used to fulfill this function.

Figure 2A:
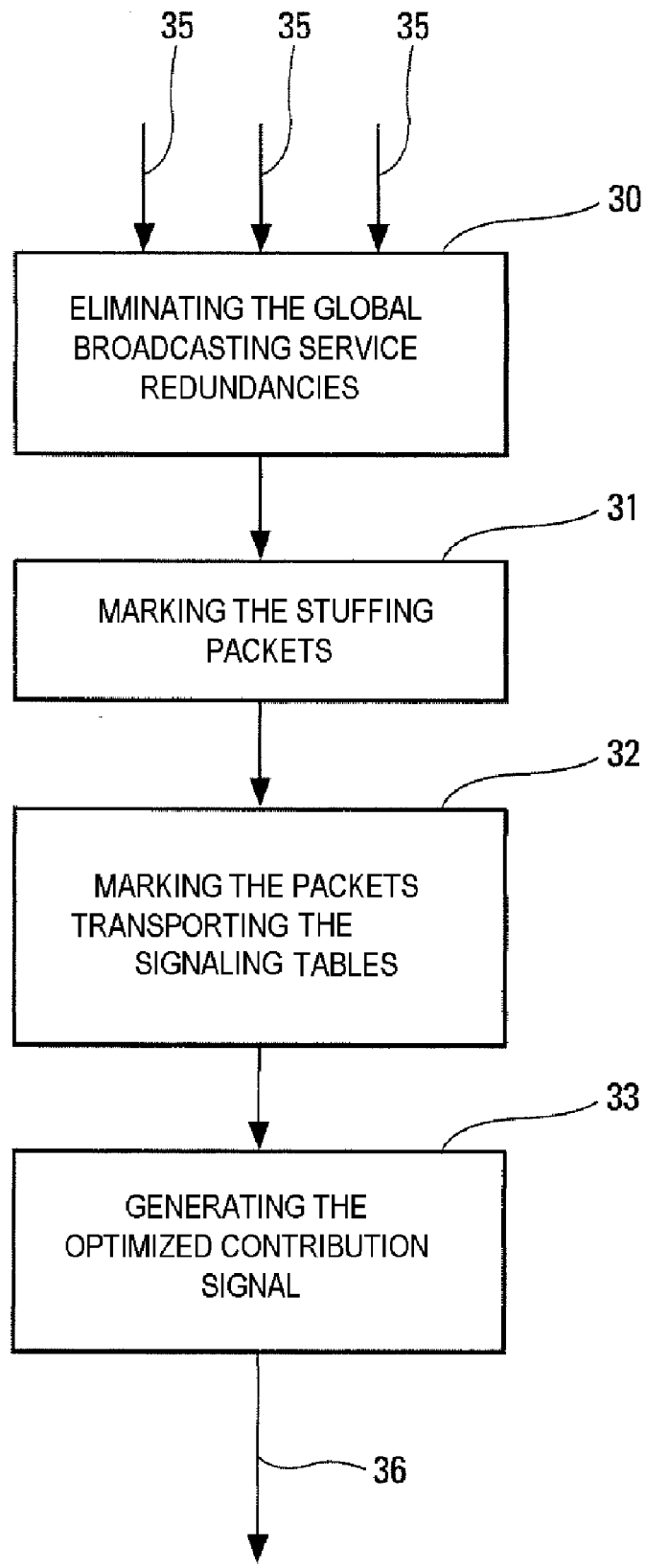
FIG. 2a, the steps implemented by an inventive method of generating an optimized contribution signal.
Figure 2B:
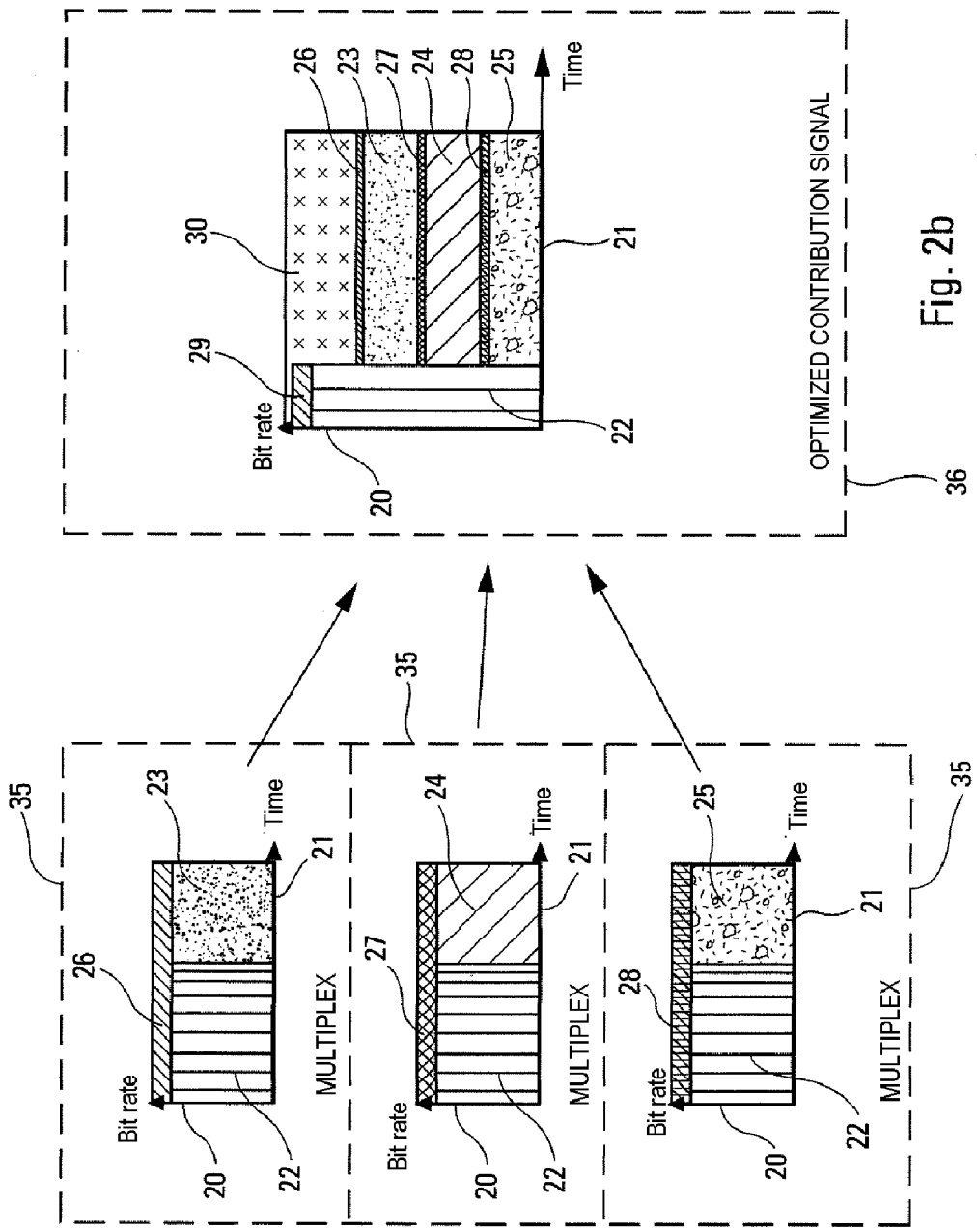
FIG. 2b, the various data streams before and after the implementation of the inventive method of multiplexing contributions.

FIG. 2a shows the steps implemented by an inventive method of generating an optimized contribution signal. FIG. 2b shows the various data streams before and after the implementation of the inventive method of multiplexing contributions. The elements that are identical to the elements already present in the other figures are given the same references. The inventive method can notably be implemented in the part of an inventive regionalized data broadcasting system one of the functions of which is to generate an optimized contribution signal.

The inventive method of generating an optimized contribution signal receives as input at least one global broadcasting service 2 and regional services 3. The term "multiplex" 35 will be used hereinafter to denote the signal comprising all the global broadcasting services 2 and regional services 3 intended for a given geographic region 9. The inventive method receives, for each geographic region 9, a multiplex 35. The inventive method delivers as output an optimized contribution signal 36. FIG. 2b illustrates the case where the inventive method receives as input three multiplexes 35 and delivers as output an optimized contribution signal 35. In FIG. 2b, the data stream diagrams comprise an x-axis 21 representing time and a y-axis 20 representing the bit rate of the data streams. The main object of the inventive method of multiplexing contributions is to reduce the bandwidth needed to broadcast the regional services of the various regions 9 and deliver an optimized contribution signal 36 from which each receiver 11 can retrieve the regional services 3 that are intended for it. Now, the constraints linked notably to the broadcasting of services satisfying the DVB-H standard require a synchronization to be observed between the transmitter and the receiver of the service that does not tolerate the least insertion or deletion of information bits in the signal.

In a step 30 of the inventive method, the redundant global broadcasting services 2 are eliminated. For each global broadcasting service 2, only a single data stream is retained. In practice, by definition, the global broadcasting services 2 are present in each multiplex 35. The step 30 of eliminating redundancies in the global broadcasting services 2 makes it possible to retain in the optimized contribution signal 36 only the global broadcasting services 2 that are different from each other. Thus, in FIG. 2*b*, there are three multiplexes 35:

- a first multiplex 35 comprising a global broadcasting service 22 and a regional service 23 broadcast in bursts;
- a second multiplex 35 comprising the global broadcasting service 22 and a regional service 24 broadcast in bursts;
- a third multiplex 35 comprising the global broadcasting service 22 and a regional service 25 broadcast in bursts.

At the end of the inventive method, and notably at the output of the step 30, the optimized contribution signal 36 comprises only one data stream corresponding to the global broadcasting service 22.

To retain a constant bit rate, the data streams supporting the services comprise stuffing packets. These stuffing packets make it possible to transmit a stream with a known bit rate, enabling the receivers 11 to locate themselves in time. These stuffing packets are specific to a given multiplex 35. Furthermore, the data streams supporting the services comprise signaling tables specific to each multiplex 35. Thus, as illustrated in FIG. 2*b*:

- the first multiplex 35 comprises stuffing packets and packets transporting the signaling tables 26;
- the second multiplex 35 comprises stuffing packets and packets transporting the signaling tables 27;
- the third multiplex 35 comprises stuffing packets and packets transporting the signaling tables 28.

The data stream supporting the global broadcasting services 22 also comprises packets transporting the signaling tables 29.

FIG. 2*b* shows a case where the bit rate of the stuffing packets is constant. However, the bit rate can be variable over time and differ from one multiplex 35 to another.

In a step 31 for marking stuffing packets, the stuffing packets 26, 27, 28 are marked according to the multiplex 35 to which they belong. The function of this operation is to associate a stuffing packet 26, 27, 28 with a given multiplex 35. This operation can, for example, be implemented by applying a translation of the identifier Pid of the stuffing packets 26, 27, 28.

In a step 32 for marking packets transporting the signaling tables, the packets transporting the signaling tables 26, 27, 28 are marked according to the multiplex 35 to which they belong. The function of this operation is to associate packets transporting the signaling tables 26, 27, 28 with a given multiplex 35. This operation can, for example, be implemented by applying a translation of the identifier Pid of the packets transporting the signaling tables 26, 27, 28.

In a step 33 for generation of the optimized contribution signal, a data stream is constructed notably from data streams generated in the steps 30, 31 and 32. The data stream notably comprises a data stream corresponding to the global broadcasting service 22, to the data bursts corresponding to the regional services 23, 24 and 25, to the marked stuffing packets and to the marked packets transporting the signaling tables 26, 27, 28. The remaining bandwidth can be filled by stuffing packets 30, notably if the regional services 23, 24, 25 do not have identical bit rates. The generation 33 of the optimized contribution signal 36 bundles the services according to whether they are regional 3 or for global broadcasting 2. Thus, for each burst, the global broadcasting service 22 is transmitted before the regional services 23, 24 and 25. Furthermore, the optimized contribution signal 36 comprises synchronous data bursts with identical period and bit rate. Also, the period and the bit rate of the data bursts corresponding to the regional services 23, 24 and 25 are identical. Furthermore, the data bursts corresponding to the regional services 23, 24 and 25 are synchronous: they are transmitted at the same instant. Furthermore, the generation bit rate of each multiplex 35 must correspond to the bit rate of transmission by the transmission means 12 over the terrestrial network.

In an embodiment, during the step 33 for generation of the optimized contribution signal, synchronization information is inserted into the optimized contribution signal 36. This synchronization information can, for example, take the form of MIP frames. The MIP frames contain the information needed to accomplish the synchronization between the transmission means 12 in particular.

Figure 3A:
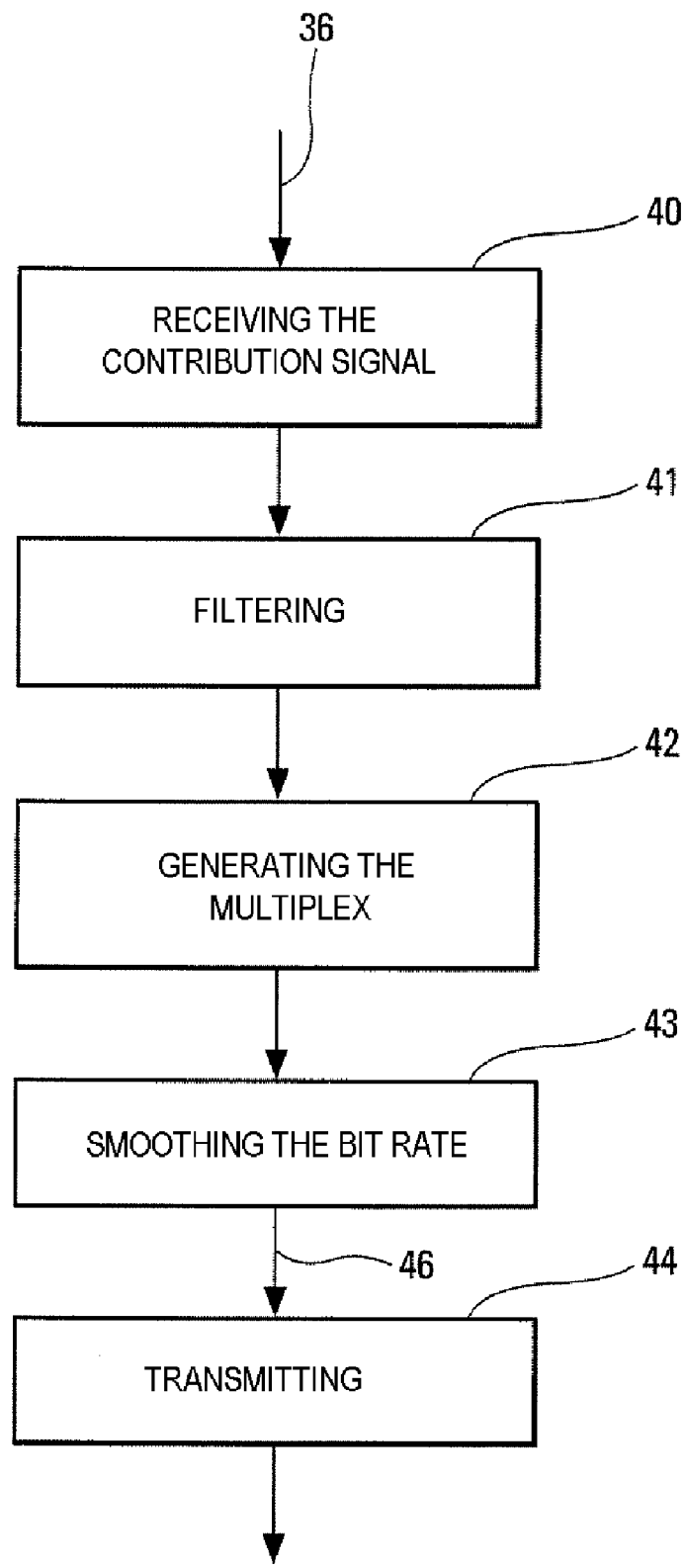
FIG. 3a, the steps implemented by an inventive method of demultiplexing contributions.

FIG. 3*a* shows the steps implemented by an inventive method of demultiplexing the contributions. The elements that are identical to the elements already present in the other figures are given the same references.

One role of the receivers 11 is to extract from the optimized contribution signal 36 the original multiplex 35 intended for their geographic region 9. The method of demultiplexing contributions according to the invention can notably be implemented in each receiver 11 receiving an optimized contribution signal 36 generated by an inventive contribution multiplexing method.

In a first step 40, the inventive contribution demultiplexing method receives the optimized contribution signal 36. The optimized contribution signal 36 comprises all the regional services 23, 24, 25 and global broadcasting services 22.

In a step 41, the optimized contribution signal 36 is filtered in order to retain only the services intended for a given geographic region 9. The packets that are not intended for the geographic region 9 to which the receiver 11 belongs are eliminated. The unmarked stuffing packets are also eliminated.

In a step 42, the multiplex 35 is regenerated. For this, it is necessary not only to reconstruct the data streams that correspond to the services intended for a given geographic region 9, but also to reconstruct the stuffing packets and the packets transporting the signaling tables specific to a given multiplex 35. For this, it is possible, for example, to translate, in a way opposite to the step 31 and 32 of the method of multiplexing contributions according to the invention, the identifier Pid of the stuffing packets and of the packets transporting the signaling tables 26, 27, 28 according to the multiplex 35 to which they belong.

Figure 3B:
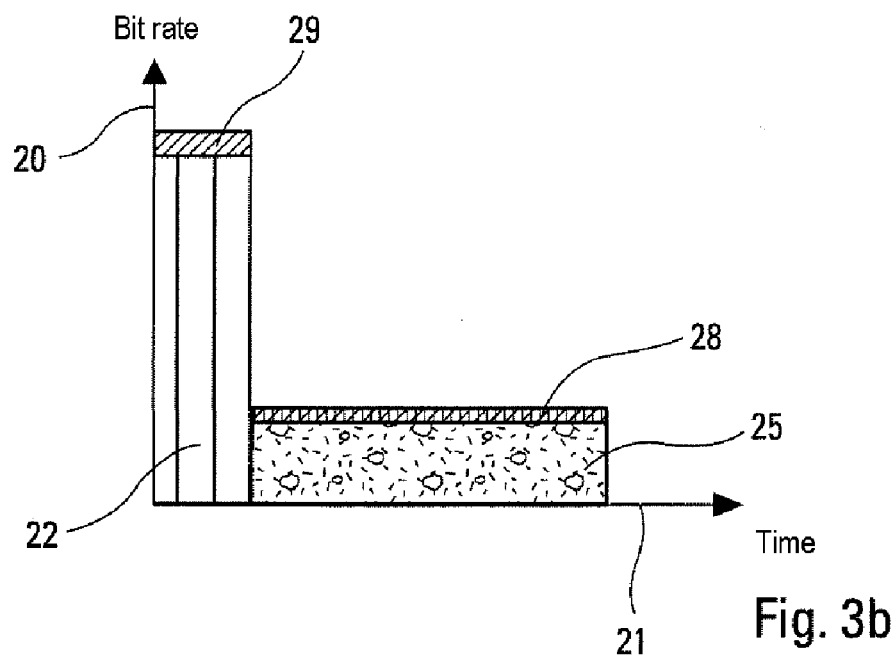
FIG. 3b, the signal obtained at the output of the multiplex generation step of the inventive method of demultiplexing contributions.

FIG. 3*b* illustrates the signal obtained at the output of the step 42 of generation of the multiplex of the inventive method of demultiplexing contributions. The elements that are identical to the elements already present in the other figures are given the same references. In FIG. 3*b*, the data stream diagram comprises an x-axis 21 representing time and a y-axis 20 representing the bit rate of the data streams. The signal comprises:

- the global broadcasting service 22 and the corresponding packets transporting the signaling tables 29;
- the regional service 25 and the stuffing packets and the packets transporting the signaling tables 28.

The bit rate of the global broadcasting service 22 is generally greater than the bit rate of the regional service 25.

Now, the bit rate at which the global broadcasting services 2 are received is generally greater than the bit rate of the transmission means 12. In a step 42, the bit rate of the signal to be transmitted 46 is smoothed.

Figure 3C:
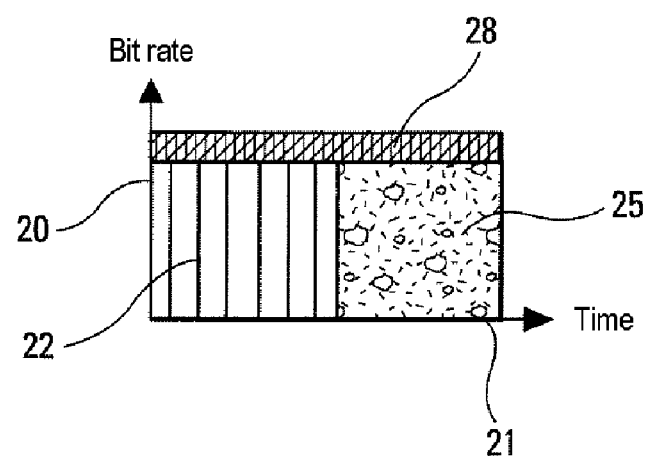
FIG. 3c, the signal obtained at the output of the bit rate smoothing step of the inventive method of demultiplexing contributions.

FIG. 3*c* illustrates the signal 46 obtained at the output of the step 43 for smoothing the bit rate of the inventive method of demultiplexing contributions. The elements that are identical to elements already present in the other figures are given the same references. In FIG. 3*b*, the data stream diagram comprises an x-axis 21 representing time and a y-axis 20 representing the bit rate of the data streams. The signal comprises:

- the global broadcasting service 22 and the corresponding packets transporting the signaling tables 29;
- the regional service 25 and the stuffing packets and the packets transporting the signaling tables 28.

Unlike the signal at the output of the multiplex generation step 42 of the inventive method of demultiplexing contributions, the bit rate is roughly constant over time, regardless of the type of service (regional 3 or global broadcasting 2) to be transmitted.

The bit rate smoothing operation 43 can be implemented via data buffers for taking and smoothing the fluctuating packet bit rate.

In a step 44, the signal 46 obtained at the output of the bit rate smoothing step 43 of the inventive method of demultiplexing contributions is then retransmitted locally, that is, in the geographic area 9 of the transmission means 12.

In an embodiment, the steps 41, 42, 43 of the inventive method of receiving and regenerating a multiplex 35 are implemented by a DVB-H modulator, used, for example, by the transmission means 12. It can then be observed that the receiver 11 has, besides pure satellite reception, only very simple tasks to perform and little memory requirement. Integrating these functions in a DVB-H modulator therefore provides a way of simplifying the receiver 11.

Figure 4:
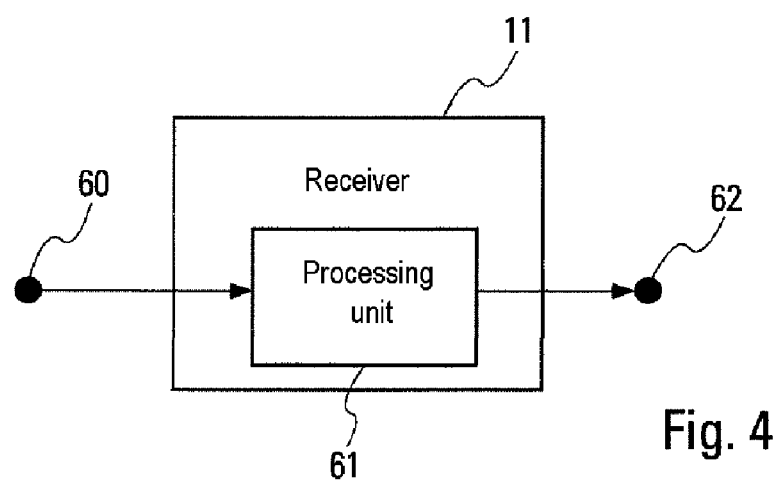
FIG. 4, by a block diagram, an embodiment of the inventive receiver.

FIG. 4 is a block diagram illustrating one embodiment of the inventive receiver 11. The elements that are identical to the elements already shown in the other figures are given the same references. The receiver 11 notably comprises a processing unit 61. The processing unit 61 can be an electronic card comprising one or more microprocessors, a programmable logic component, or any other device suitable in particular for digital computations.

The receiver 11 receives on an input 60 an optimized contribution signal 36 comprising data relating to at least one multiplex 35. Each multiplex comprises global broadcasting services 22 and regional broadcasting services 23, 24 and 25, stuffing packets and packets transporting signaling tables 26, 27, 28 marked according to the multiplex to which they belong. The processing unit 61 of the receiver 11 constructs a signal sent to an output 62 by implementing the steps of the inventive method of demultiplexing contributions (notably illustrated by FIG. 3*a*). The output 62 can notably be connected to the transmission means 12.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of generating an optimized contribution signal comprising multiplexes, each multiplex comprising global broadcasting services and an own combination of regional services, each multiplex comprising stuffing packets and packets transporting signaling tables, wherein the optimized contribution signal is generated by:
    retaining only the global broadcasting services which are different from one another;
    marking the stuffing packets and the packets transporting the signaling tables according to the multiplex to which they belong;
    constructing data bursts from the data streams corresponding to the global broadcasting services, to the regional services, and to the marked stuffing packets and to the marked packets transporting the signaling tables.

2. The method as claimed in claim 1, wherein the stuffing packets and the packets transporting the signaling tables are marked by applying a translation of the identifier (Pid) of said stuffing packets and of the packets transporting the signaling tables.

3. The method as claimed in claim 1, wherein the data bursts of the optimized contribution signal are constructed firstly for all the global broadcasting services, then secondly for all the regional services.

4. The method as claimed in claim 1, wherein the optimized contribution signal comprises synchronous data bursts with identical period and bit rate.

5. The method as claimed in claim 1, wherein synchronization information is introduced into the optimized contribution signal.

6. The method as claimed in claim 1, wherein the optimized contribution signal conforms to the DVB-H standard.

7. A demultiplexing method, wherein, for a given geographic region, from an optimized contribution signal comprising data relating to at least one multiplex, each multiplex comprising global broadcasting services and regional broadcasting services, stuffing packets and packets transporting signaling tables marked according to the multiplex to which they belong, a signal is constructed by:
    retaining only the services intended for said geographic region;
    constructing data bursts from the data streams included in the optimized contribution signal corresponding:
        to the global broadcasting services;
        to the regional services intended for said geographic region;
        to the marked stuffing packets and to the marked packets transporting the signaling tables corresponding to the regional services intended for said geographic region.

8. The method as claimed in claim 7, wherein, during the data burst construction step, the identifier (Pid) of the marked stuffing packets and the marked packets transporting the signaling tables is translated so as to reconstruct the data streams corresponding to the services intended for the geographic region.

9. The method as claimed in claim 1, wherein it comprises a step for smoothing the bit rate of the signal constructed in the data burst construction step.

10. A system for broadcasting regional services and global broadcasting services, said system being able to generate an optimized contribution signal comprising multiplexes, each multiplex comprising the global broadcasting services and an own combination of regional services, and each multiplex comprising stuffing packets and packets transporting signaling tables, wherein said system is able to broadcast certain regional services and global broadcasting services in data bursts, the contribution signal being generated by:
    retaining only the global broadcasting services that are different from one another;
    marking the stuffing packets and the packets transporting the signaling tables according to the multiplex to which they belong;
    constructing data bursts from the data streams corresponding to the global broadcasting services, to the regional services, and to the marked stuffing packets and to the marked packets transporting the signaling tables,
said system preferably being able to implement the signal generation method as claimed in claim 1.

11. The broadcasting system as claimed in claim 10, wherein said system being designed to broadcast the multiplexes over a coverage area comprising geographic regions and each geographic region receiving at least one multiplex, said system comprises receivers distributed over various geographic regions and able to receive said optimized signal transmitted in the coverage area, each receiver being able to generate from the optimized contribution signal a signal to be transmitted intended for the geographic region in which said receiver is located, the signal to be transmitted being transmitted by transmission means to the whole geographic region in which the transmission means are located, the transmission means forming a single-frequency network and being synchronized, at least some of said receivers preferably being able to implement the demultiplexing method as claimed in claim 1.

12. A receiver comprising a processing unit, an input and an output, wherein the input being designed to receive an optimized contribution signal comprising data relating to at least one multiplex, each multiplex comprising global broadcasting services and regional services, stuffing packets and packets transporting signaling tables marked according to the multiplex to which they belong, the processing unit is able to construct a signal sent to the output by:
  retaining only the services intended for said geographic region;
  constructing data bursts from the data streams included in the optimized contribution signal corresponding:
    to the global broadcasting services;
    to the regional services intended for said geographic region;
    to the marked stuffing packets and to the marked packets transporting the signaling tables corresponding to the regional services intended for said geographic region,
  said receiver preferably being able to implement the demultiplexing method as claimed in claim 1.

13. An optimized contribution signal comprising multiplexes, each multiplex comprising global broadcasting services and its own combination of regional services, each multiplex comprising stuffing packets and packets transporting signaling tables, wherein the optimized contribution signal is such that:
  the global broadcasting services are different from one another;
  the stuffing packets and the packets transporting the signaling tables are marked according to the multiplex to which they belong;
  said signal comprises data bursts constructed from the data streams corresponding to the global broadcasting services to the regional services, and to the marked stuffing packets and to the marked packets transporting the signaling tables,
  said signal preferably being generated by a signal generation method as claimed in claim 1.

* * * * *